US011459027B2

(12) United States Patent
Rahimzai

(10) Patent No.: US 11,459,027 B2
(45) Date of Patent: Oct. 4, 2022

(54) HYDRAULIC STEERING ARRANGEMENT

(71) Applicant: Danfoss Power Solutions ApS, Nordborg (DK)

(72) Inventor: Abdul Karim Rahimzai, Sønderborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 279 days.

(21) Appl. No.: 16/595,837

(22) Filed: Oct. 8, 2019

(65) Prior Publication Data

US 2020/0114956 A1    Apr. 16, 2020

(30) Foreign Application Priority Data

Oct. 10, 2018    (DE) .......................... 102018125053.3

(51) Int. Cl.
*B62D 5/09* (2006.01)
*B62D 5/06* (2006.01)
(52) U.S. Cl.
CPC .............. *B62D 5/09* (2013.01); *B62D 5/062* (2013.01)
(58) Field of Classification Search
CPC ................................. B62D 5/09; B62D 5/062
USPC ....................................................... 180/422
See application file for complete search history.

(56) References Cited

U.S. PATENT DOCUMENTS

| | | | | |
|---|---|---|---|---|
| 4,204,584 A | * | 5/1980 | de Maight | B62D 5/09 180/406 |
| 4,620,416 A | | 11/1986 | Yip et al. | |
| 4,759,182 A | * | 7/1988 | Haarstad | B62D 5/097 60/384 |
| 4,768,605 A | * | 9/1988 | Miller | B62D 6/00 180/421 |
| 4,958,493 A | * | 9/1990 | Schutten | B62D 5/097 137/596.13 |
| 5,014,596 A | * | 5/1991 | St. Martin | B62D 5/09 91/427 |

(Continued)

FOREIGN PATENT DOCUMENTS

| | | |
|---|---|---|
| CN | 101772627 A | 7/2010 |
| CN | 104097686 A | 10/2014 |

(Continued)

*Primary Examiner* — Jacob D Knutson
*Assistant Examiner* — Myles A Harris
(74) *Attorney, Agent, or Firm* — McCormick, Paulding & Huber PLLC

(57) ABSTRACT

A hydraulic steering arrangement 1 is described comprising a supply port arrangement having a pressure port (4) and a tank port (5), a working port arrangement having two working ports (6, 7), a steering unit (2) arranged in a flow path (9) between the supply port arrangement (4, 5) and the working port arrangement (6, 7), and a second flow path (13) in form of an amplification flow path bridging the steering unit (2) and having an amplification orifice ($A_{U1}$) which is controlled as function of the steering unit (2). Such a steering arrangement should have a possibility to change the steering behaviour. To this end at least a third flow path (14) in form of an amplification flow path is arranged in parallel to the second flow path (13), wherein the second/or the third flow path (13, 14) comprise an valve (15).

16 Claims, 1 Drawing Sheet

(56) References Cited

U.S. PATENT DOCUMENTS

| | | | | |
|---|---|---|---|---|
| 5,184,693 A * | 2/1993 | Miller | | B62D 5/06 180/423 |
| 5,303,636 A * | 4/1994 | Stephenson | | B62D 6/00 180/422 |
| 5,819,532 A * | 10/1998 | Wang | | B62D 5/09 60/384 |
| 5,970,708 A * | 10/1999 | Bergmann | | B62D 5/32 60/384 |
| 9,174,670 B2 * | 11/2015 | Bauer | | B62D 1/22 |
| 9,242,668 B2 * | 1/2016 | Ennemark | | B62D 5/32 |
| 9,744,990 B2 * | 8/2017 | Porskrog | | B62D 5/065 |
| 9,920,776 B2 * | 3/2018 | Krahn | | F15B 13/0402 |
| 10,308,280 B2 * | 6/2019 | Petersen | | B62D 5/09 |
| 10,611,402 B2 * | 4/2020 | Arbjerg | | B62D 5/093 |
| 10,625,775 B2 * | 4/2020 | Soerensen | | B62D 5/065 |
| 10,717,464 B2 * | 7/2020 | Arbjerg | | B62D 5/08 |
| 10,953,915 B2 * | 3/2021 | Arbjerg | | B62D 5/093 |
| 2008/0251310 A1 * | 10/2008 | Hinz | | B62D 5/09 180/432 |
| 2009/0152828 A1 * | 6/2009 | Bebernes | | B62D 11/04 280/86 |
| 2013/0087209 A1 * | 4/2013 | Krahn | | B62D 1/22 137/2 |
| 2013/0161113 A1 * | 6/2013 | Sakamaki | | B62D 5/09 180/421 |
| 2014/0298792 A1 * | 10/2014 | Andersen | | B62D 5/093 60/433 |
| 2014/0374187 A1 * | 12/2014 | Arbjerg | | B62D 5/30 180/441 |
| 2017/0297617 A1 | 10/2017 | Petersen et al. | | |
| 2018/0281852 A1 * | 10/2018 | Eagles | | B62D 5/093 |
| 2019/0002018 A1 * | 1/2019 | Bergmann | | B62D 5/062 |
| 2019/0031233 A1 * | 1/2019 | Bergmann | | B62D 5/075 |
| 2019/0071119 A1 * | 3/2019 | Takenaka | | E02F 9/2004 |
| 2020/0114954 A1 * | 4/2020 | Rahimzai | | B62D 5/062 |
| 2020/0114955 A1 * | 4/2020 | Hansen | | B62D 15/022 |
| 2020/0223476 A1 * | 7/2020 | Mate | | B62D 5/09 |
| 2020/0391794 A1 * | 12/2020 | Brinkley | | B62D 5/062 |
| 2021/0001930 A1 * | 1/2021 | Ognibene | | B62D 49/0692 |

FOREIGN PATENT DOCUMENTS

| | | | | |
|---|---|---|---|---|
| CN | 110630571 A | * | 12/2019 | |
| DE | 102004059831 A1 | * | 7/2006 | B62D 5/065 |
| DE | 102013104792 A1 | * | 11/2014 | B62D 3/14 |
| DE | 102017100186 A1 | | 7/2018 | |
| EP | 2786915 A1 | | 10/2014 | |
| KR | 20200062821 A | * | 6/2020 | |
| KR | 20200065597 A | * | 6/2020 | |
| RU | 2724037 C1 | * | 6/2020 | |

* cited by examiner

HYDRAULIC STEERING ARRANGEMENT

CROSS-REFERENCE TO RELATED APPLICATIONS

This application claims foreign priority benefits under U.S.C. § 119 to German Patent Application No. 102018125053.3, filed on Oct. 10, 2018, which is hereby incorporated by reference in its entirety.

TECHNICAL FIELD

The present invention relates to a hydraulic steering arrangement comprising a supply port arrangement having a pressure port and a tank port, a working port arrangement having two working ports, a steering unit arranged in a first flow path between the supply port arrangement and the working port arrangement, and a second flow path in form of an amplification flow path bridging the steering unit and having an amplification orifice which is controlled as a function of the steering unit.

BACKGROUND

Such a hydraulic steering arrangement is known, for example, from EP 2 786 915 A1.

Hydraulic fluid is supplied to the working port arrangement via the first flow path and via the second flow path. The flow through the first flow path is controlled by the steering unit which can be, for example, actuated by a steering wheel or the like. The flow through the second flow path is basically controlled by the amplification orifice. The amplification orifice in turn is controlled by the steering unit. To this end, for example, the amplification orifice is formed by the same set of spool and sleeve as other orifices in the first flow path.

A vehicle equipped with such a steering arrangement is often operated under different conditions, for example on road and off road. Each operating condition can require a certain steering behaviour of the steering unit.

SUMMARY

The object underlying the invention is to have a possibility to change the steering behaviour of the steering arrangement.

This object is solved with a hydraulic steering arrangement as described at the outset in that at least a third flow path in form of an amplification flow path is arranged in parallel to the second flow path, wherein the second and/or the third flow path comprise a valve.

Such a steering arrangement allows to adjust the flow from the supply port arrangement to the working port arrangement in at least two different ways. A maximum flow can be reached when not only the first flow path, but also the second and the third flow path are open, i.e. the valve allows a flow to pass. A second possibility is to interrupt or throttle one of the amplification flow paths so that only the other amplification flow path supplies a full or unthrottled amount of hydraulic fluid from the supply port arrangement to the working port arrangement. A third possibility would be to interrupt or throttle both amplification flow paths so that only the first flow path is fully active.

In an embodiment of the invention the valve is an on/off-valve. In this embodiment one of the amplification flow paths can completely be closed or opened, so that there are a limited number of possibilities to control the supply of fluid from the pressure port to the working port arrangement.

In a preferred embodiment the valve is a remotely controlled valve. The driver of the vehicle does not need to have a direct access to the valve.

The valve is preferably an electrically controlled valve. An electrically controlled valve can easily be remotely actuated.

In an embodiment of the invention the valve is a pulse width modulated valve. A pulse width modulated valve is an on/off-valve which is opened during a part of a period and closed over the remaining part of the period. Accordingly, the average flow through the pulse width modulated valve can be controlled as desired.

In an embodiment of the invention the second and the third flow path have different amplification characteristics. It is, for example, possible to have an amplification of 100% in the second flow path, i.e. the flow through the second flow path is the same as in the first flow path, and to have an amplification of 150% in the third flow path, i.e. the flow through the third flow path is 1.5-times the flow through the first flow path. In such an arrangement it is possible to have 100%, 200%, 250% or 350% of the flow through the first flow path.

In an embodiment of the invention at least one of the second and third flow path has a progressive amplification characteristic. In other words, the larger the steering wheel speed is, the more flow is supplied to the working port arrangement, i.e. a correlation between the rotation speed of the steering wheel and the flow is not proportional.

BRIEF DESCRIPTION OF DRAWINGS

A preferred embodiment of the invention will now be described with reference to the drawing, wherein.

DETAILED DESCRIPTION

Figure 1:
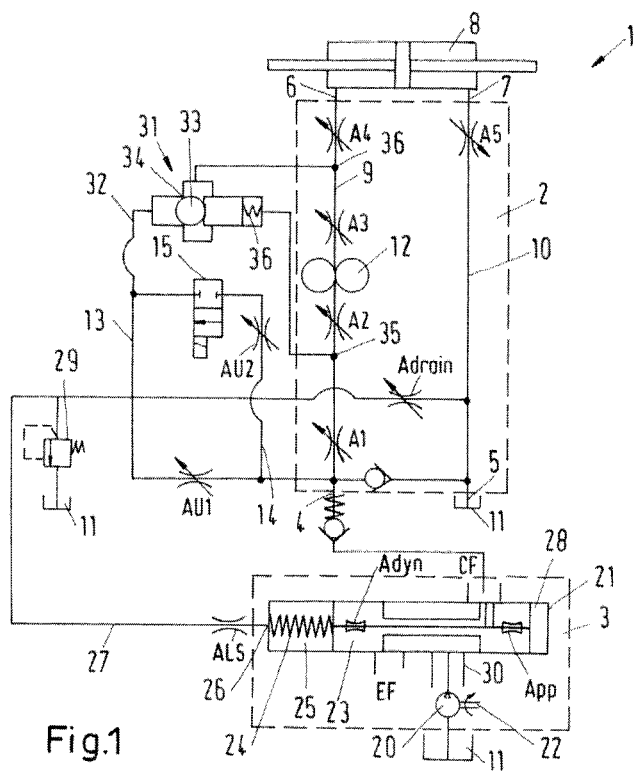
FIG. 1 shows schematically a hydraulic steering arrangement.

A hydraulic steering arrangement 1 comprises a steering unit 2 and an adjustable pressure source 3. The adjustable pressure source 3 is connected to a pressure port 4 of the steering unit 2. The steering unit 2 furthermore comprises a return port 5. The pressure port 4 and the return port 5 together form a supply port arrangement. Furthermore, the steering unit 2 comprises a working port arrangement comprising two working ports 6, 7 which are connected to a steering motor 8.

The steering unit 2 comprises a main flow path 9 as a first flow path which is arranged between the pressure port 4 and the working port arrangement 6, 7. It depends on the direction of steering which of the two working ports 6, 7 is connected to the main flow path 9. The other of the two working ports 6, 7 is connected to the return port 5 by means of a return flow path 10. The return port 5 is connected to a tank 11.

The steering unit 2 comprises a number of variable orifices, commonly referred to as $A_1, A_2, A_3, A_4, A_5$, wherein a main orifice $A_1$ basically determines the flow through the main flow path 9. Furthermore, a flow meter 12 is arranged within said main flow path 9 metering the amount of hydraulic fluid coming from the pressure port 4 to the working port arrangement 6, 7.

When a steering wheel (not shown) is turned, the orifices $A_1, A_2, A_3, A_4, A_5$ are opened so that hydraulic fluid can flow from the supply port 4 to one of the working ports 6, 7. This flow enters the flow meter 12 and drives it, so that the flow meter can restore the orifices $A_1$-$A_5$ to their initial condition. To this end the orifices are formed by a spool sleeve set. The steering wheel turns one of spool and sleeve to open the respective orifices. The other of spool and sleeve is connected to a driven part of the flow meter so that the orifices are restored back to their initial condition once the required amount of fluid (defined by the turning of the steering wheel) has reached the working port arrangement.

An amplification flow path 13 forming a second flow path and having an amplification orifice $A_{U1}$ is arranged parallel to a section of the main flow path 9, which section comprises the main orifice $A_1$, the flow meter 12, and the two flow meter orifices $A_2$ and $A_3$. The amplification orifice $A_{U1}$ is controlled similarly to the main orifice $A_1$, i.e. the amplification orifice $A_{U1}$ opens basically together with the main orifice $A_1$ and closes basically together with the main orifice $A_1$. However, the instant opening of the amplification orifice $A_{U1}$ is or can be proportional to the instant opening of the main orifice $A_1$. It is also possible that the opening degree of the main orifice $A_1$ and of the amplification orifice $A_{U1}$ is not proportional, but the opening degree of the amplification orifice $A_{U1}$ increases faster than the opening degree of the main orifice $A_1$. Such a behaviour is called a progressive behaviour.

Furthermore, a second amplification flow path 14 forming a third flow path is arranged in parallel to the first amplification orifice $A_{U1}$. The second amplification flow path 14 comprises a second amplification orifice $A_{U2}$ which is controlled similarly to the first amplification orifice $A_{U1}$, i.e. it changes the opening degree proportional to the opening degree of the main orifice $A_1$ or in a progressive way.

The second amplification flow path 14 comprises an on/off-valve 15 so that the second amplification flow path 14 can be interrupted or opened. A similar on/off-valve (not shown) can be arranged in the first flow path 13 to interrupt or open the first amplification flow path 13.

The valve 15 is a remotely controlled valve, preferably in form of an electrically controlled valve.

In the embodiment shown in FIG. 1 (without a valve in the first amplification flow path 13) it is possible to adjust two steering conditions. In a first condition, a fluid supplied to the working port arrangement 6 flows through the main flow path 9 and through the first amplification flow path 13. In the second condition there is an additional flow through the second amplification flow path 14, when the on/off-valve 15 is open.

Accordingly, there are three flow paths, through which the fluid can flow from the supply port 4 to the working port arrangement 6, 7, i.e. the main flow path 9 forms the first flow path, the first amplification flow path 13 forms the second flow path, and the second amplification flow path 14 forms the third flow path.

It is possible to provide more than the two amplification flow paths 13, 14 so that a fourth, fifth, and so on flow path can be provided as well.

Figure 2:
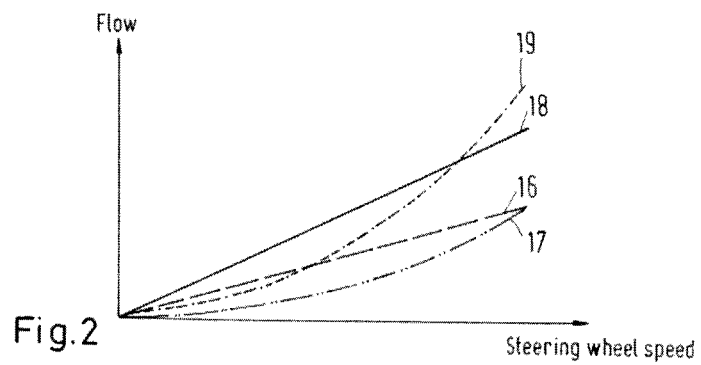
FIG. 2 shows several curves illustrating the flow as function of the steering wheel speed for different switching conditions of the on/off-valve.

FIG. 2 shows the different steering conditions. In FIG. 2 the steering wheel speed is shown on the horizontal axis whereas the flow is shown on the vertical axis.

A curve 16 shows the steering condition when the valve 15 is closed. A curve 17 shows the same condition when the first amplification orifice $A_{U1}$ has a progressive characteristic, i.e. there is no linear relation between the opening degrees of the main orifice $A_1$ and the first amplification orifice $A_{U1}$.

A curve 18 shows the steering condition when the valve 15 is open and a curve 19 shows the steering condition when the valve 15 is open and the amplification orifices $A_{U1}, A_{U2}$ have a progressive characteristic.

The pressure source 3 comprises a pump 20 and a dynamic priority valve 21. The pump 20 can be a fixed replacement pump driven via a shaft 22 by means of an engine or a motor of a vehicle to be steered, such engine being not shown in the Fig.

The priority valve 21 comprises a main output CF connected to the pressure port 4 of the steering unit 2 and a further output EF which is or can be connected to other hydraulic consumers having a lower priority than the steering unit 2.

The priority valve 21 comprises a piston 23 which is loaded by a spring 24 in a direction in which the main output CF has its maximum opening degree. The spring 24 is arranged in a spring chamber 25. The spring chamber 25 is connected to a load sensing port 26. The load sensing port 26 is connected to a load sensing line 27 via a load sensing orifice $A_{LS}$ which is a fixed orifice. The piston 23 is loaded with a pressure in a pressure chamber 28. The pressure in the pressure chamber 28 is connected to the main output CF of the priority valve 21 via a fixed orifice $A_{pp}$.

The load sensing line 27 is connected to the tank 5 via a drain orifice $A_{drain}$ which is a variable orifice. Furthermore, the load sensing line 27 is connected to tank 5 by means of an overpressure valve 29. The pressure chamber 25 is connected to the main output CF via a fixed orifice $A_{dyn}$. In the present example, both orifice $A_{pp}$, $A_{dyn}$ are shown to be arranged within the piston 23. However, it is possible to use external lines to establish the connections between the input 30 of the priority valve 21 and the pressure chamber 28 or the spring chamber 25, respectively.

A safety valve 31 is arranged in the line 32 connected to the ends of both amplification flow paths 13, 14. In other words, line 32 takes the flow of both amplification paths 13, 14. The safety valve 31 comprises a valve element 33 which is urged in a direction towards a valve seat 34 under the action of the pressure at a point 35 between the main orifice $A_1$ and the first steering unit orifice $A_2$. The valve element 33 is loaded in the opposite direction by a pressure in line 32.

Under normal conditions, i.e. with a flow through the main flow path 9 the pressure in line 32 will be higher than a pressure at point 35 so that the valve element 33 is lifted from the valve seat 34 and the flow through the amplification flow path 13 and/or 14 can reach the working port arrangement 6, 7. However, when, for example, the flow meter 12 or one of the orifices downstream the main orifice $A_1$ are blocked, the pressure at point 35 increases and will be at least as high as the pressure in line 32. In addition, the valve element 33 is loaded by the force of a spring 36 so that the safety valve 31 is closed.

An output of the safety valve 31 is connected to the main flow path 9 at a point 36 between the second flow meter orifice $A_3$ and one of the working port orifices $A_4$, $A_5$. The working port orifices $A_4$, $A_5$ are dimensioned such that they can take over the complete flow through the two or three flow paths 9, 13 or 9, 13, 14.

The operation of the hydraulic steering arrangement 1 can be described as follows:

As long as the steering wheel is not actuated, the main orifice $A_1$ and the amplification orifices $A_{U1}, A_{U2}$ are closed, whereas the drain orifice $A_{drain}$ is open or at least partly open. There is basically no pressure at point 35 and no pressure in line 32.

The piston 23 of the priority valve 21 is loaded by a pressure in the pressure chamber 28 corresponding to the pressure at the input 30 of the priority valve 21, since there is basically no flow out of said pressure chamber 28. The piston 23 is loaded in the other direction by the pressure in the spring chamber 25 and the force of the spring 24. The pressure in the spring chamber 25 is lower than the pressure in the pressure chamber 23 since there is a flow of hydraulic fluid from the input 30 through the orifice $A_{dyn}$, the orifice $A_{LS}$ and the orifice $A_{drain}$ to the tank.

In this situation the pressure at the load sensing port 26 is determined by a pressure divider formed by the two orifices $A_{dyn}$ and $A_{LS}$. The piston 23 is adjusted by the forces mentioned, so that the main output CF and the further output EF are both supplied with hydraulic fluid from the pump 20.

When the steering wheel is actuated, the main orifice $A_1$ opens and the drain orifice $A_{drain}$ closes, so that the pressure at the load sensing port 26 increases shifting the piston 23 in a direction in the main output CF of the priority valve 21 is wider open so that the steering unit 2 is sufficiently supplied with hydraulic fluid.

The first amplification orifice $A_{U1}$ and the second amplification orifice $A_{U2}$ open proportional or progressively in relation to the main orifice $A_1$. As long as the valve 15 is closed, only the first amplification flow path is open and a corresponding amount of fluid flows through the first amplification flow path from the supply port 4 to the working port arrangement 6, 7. This is shown with the curves 16, 17 in FIG. 2.

When the valve 15 is open, the flow through the second amplification flow path adds to this flow so that the relation shown with curves 18, 19 in FIG. 2 is achieved.

In the description above the valve 15 has been described as on/off-valve. This on/off-valve can be operated in a pulse width modulated mode, i.e. the valve 15 is open over a part of a period and closed over the remaining part of the period. The proportion of "on" time to the time length of the period is also called "duty cycle". When, for example, the duty cycle is 50%, the flow through valve 15 is throttled to 50%.

It is, however, possible to use another valve 15 which can be throttled in another way.

In all cases, the amplification could be controlled in relation to parameters of the vehicle, for example the vehicle speed or the vehicle load.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering arrangement comprising a supply port arrangement having a pressure port and a tank port, a working port arrangement having two working ports, a steering unit having a main orifice arranged in a first flow path between the supply port arrangement and the working port arrangement, and a second flow path in form of an amplification flow path bridging at least the main orifice of the steering unit and having an amplification orifice ($A_{U1}$) which receives fluid directly from the pressure port and which is controlled as a function of the steering unit, wherein at least a third flow path in form of an amplification flow path having a second amplification orifice ($AU_2$) being controlled as a function of the steering unit is arranged in parallel to at least the amplification orifice ($A_{U1}$) of the second flow path and receives fluid directly from the pressure port, wherein the second or the third flow path comprise a valve.

2. The hydraulic steering arrangement according to claim 1, wherein the valve is an on/off-valve.

3. The hydraulic steering arrangement according to claim 2, wherein the valve is a remotely controlled valve.

4. The hydraulic steering arrangement according to claim 2, wherein the valve is a pulse width modulated valve.

5. The hydraulic steering arrangement according to claim 2, wherein the second and the third flow paths have different amplification characteristics.

6. The hydraulic steering arrangement according to claim 1, wherein the valve is a remotely controlled valve.

7. The hydraulic steering arrangement according to claim 6, wherein the valve is an electrically controlled valve.

8. The hydraulic steering arrangement according to claim 7, wherein the valve is a pulse width modulated valve.

9. The hydraulic steering arrangement according to claim 6, wherein the valve is a pulse width modulated valve.

10. The hydraulic steering arrangement according to claim 6, wherein the second and the third flow paths have different amplification characteristics.

11. The hydraulic steering arrangement according to claim 1, wherein the valve is a pulse width modulated valve.

12. The hydraulic steering arrangement according to claim 1, wherein the second and the third flow paths have different amplification characteristics.

13. The hydraulic steering arrangement according to claim 12, wherein at least one of the second and third flow paths has a progressive amplification characteristic.

14. The hydraulic steering arrangement according to claim 1, wherein the second flow path and the third flow path each have a valve.

15. The hydraulic steering arrangement according to claim 1, wherein the amplification orifice ($AU_1$) and the second amplification orifice ($AU_2$) are configured to increase their opening degrees when the main orifice increases its opening degree and to decrease their opening degrees when the main orifice decreases its opening degree.

16. The hydraulic steering arrangement according to claim 1, wherein the second amplification orifice ($AU_2$) is configured to change its opening degree proportional or progressive to an opening degree of the main orifice ($A_1$), and wherein the amplification orifice ($AU_1$) is configured to change its opening degree proportional or progressive to the opening degree of the main orifice.

\* \* \* \* \*